INVENTORS
JOHN LUDVIG STALHED
JOHN AUGUST BENJAMIN ODBERG
BY
ATTORNEY

Patented Aug. 19, 1952

2,607,667

UNITED STATES PATENT OFFICE 2,607,667

REDUCTION OF $CO_2$-CONTAINING GASES

John Ludvig Stålhed and John August Benjamin Ödberg, Soderfors, Sweden, assignors to Stora Kopparbergs Bergslags Aktiebolag, Falun, Sweden, a corporation of Sweden Application December 31, 1947, Serial No. 794,858
In Sweden October 31, 1946

Section 1, Public Law 690, August 8, 1946
Patent expires October 31, 1966

7 Claims. (Cl. 48—65)

The reduction of $CO_2$-containing gases for metallurgical purposes has hitherto as a rule been carried out in such a way, that the starting gas is blown through an electrically heated layer of charcoal. Because of charcoal being much more expensive than coke it has for a long time been desired to replace the charcoal by the less expensive coke in this reduction process. In a certain type of cupolas, or rather water-gas generators, in which water vapour is transformed into water gas by reaction with a carbonaceous material, it has been tried to replace charcoal by the less expensive material coke. On account of the high temperature required when using coke for reduction purposes the difficulty arises that the ash constituents of the coke will sinter and that satisfactory arrangements for discharging sintered slag or ashes so far are not available. In the water gas generators mentioned above it has been tried to obviate this drawback by increasing the temperature further and discharging the ash or clinker in fluid (molten) condition. Because of the highly reducing condition prevailing in the generator at the elevated temperatures in question there are also formed carbides and silicon alloys which render it very difficult not to say impossible to discharge the clinkers in the molten state. It has also been tried to obviate the difficulties in gasifying coke in such a way that the heat energy required for the reduction instead of being induced in the layer of coke is supplied to the gas before this is introduced into the cupola. This expedient for solving the problem, however, renders it necessary to use excessive temperatures of the gas according to its low heat capacity in relation to that of coke and this circumstance in turn has necessitated a complicated and, in spite of that, short lived device for heating the gas with the result that the method under consideration has become uneconomical and consequently not successful in practice.

It is possible, by changing the strength and voltage of current with regard to the higher conductivity of coke as compared with charcoal, to attain the temperature required for the reduction even if a common charcoal cupola is charged with coke. Experiments in this direction, however, have given the result that the difficulties mentioned above and originating from the sintering of coke clinkers hitherto have made the method impractical.

The present invention relates to such a modification of the method and the arrangements hitherto used in reduction by means of charcoal so that such methods and arrangements may be used for reduction by means of readily sintering reduction agents, such as coke. The method according to the invention is mainly characterized thereby, that the gas to be reduced is supplied to an electrically heated layer of coke, which layer is of such volume that the reduction can be carried out at a temperature below that at which the risk of sintering arises.

According to a preferred embodiment of the invention the desired volume and thereby the required time of contact between the gas and the pieces of coke is attained by providing a layer of coke of large extent in the direction of flow of the gas and that the entire column of coke in the path of the gas flowing through the cupola is supplied with electric energy, so that the entire column of coke mentioned will become heated to the desired reduction temperature. In this last mentioned embodiment it is important when the electric energy is supplied through electrodes of a material, which may be affected by the gases, that the electrodes are protected to the greatest degree possible from attack by gases. To this end the reduction may preferably be carried out in a reduction shaft, the ends of which being provided with widenings, into which the electrodes are introduced so that the main portion of the gas will flow between the electrodes without contacting the same. This manner of locating the electrodes also makes it possible to use electrodes of larger dimensions thereby reducing the current density at the points of the electrodes and the risk of local superheating.

Due to the fact that the electrical resistance of coke like that of charcoal has a negative temperature gradient a local superheating will cause a concentration of the electric energy to the hotter places thus formed. This causes an extensive expansion of the gases in the hot zones thereby diverting the main gas flow from them so that the heat energy is accumulated without being used for the reduction, such heat accumulation also involving increased risk of the ash particles to be sintered together.

To obviate such risks the coke according to the invention is to be charged in a vertical cupola in such a way that the larger coke pieces will gather in the central portion of the shaft and the smaller coke pieces toward the walls. The greater pieces of coke have a lower electrical resistance than the smaller ones, causing the electric current to flow mainly through the central portion, the coarser pieces at the same time giving a more free passage for the gas so that the main gas flow will pass through said central portion. The gas flow will consequently tend to pass through those portions of the shaft which reach the highest temperature causing a higher degree of reduction and a cooling of the portions in which superheating might arise.

The charging of the coke in the manner described above with the coarser pieces in the central portions may be obtained in different ways known per se. Thus coke of varying particle size may be fed through one or more hoppers, preferably with a direction of fall towards the walls. The coarser pieces will thereby, after having impinged on the underlying layers, roll toward the central portion while smaller pieces will remain at the walls because the falling angle increases with decreasing particle size. Of course, the same effect may be obtained by feeding the coke centrally of the shaft using a spreading cone or by feeding through a feeding funnel rotating coaxially in relation to the shaft. All these known charging operations may, of course, be combined with a preceding screening of the coke.

One of the drawbacks in using coke for the reduction is to be found in the fact that the coke as a rule contains sulphur in an amount unallowable for metallurgical purposes. In the reduction according to the invention this drawback may be obviated by mixing the coke before or during the charging of the cupola with a material highly reactive with sulphur, such as lime, iron, for instance in the form of sponge iron, ores or the like. If lime is used as a sulphur binding agent it may possibly be supplied by mixing the coke with a slurry of lime or limestone. As according to the invention the temperature in the reduction zone will be held below the sintering temperature of the clinkers, inclusions of such sulphur binding agents are obviated so that at the bottom of the shaft there is obtained a clinker or an ash with free surfaces of the sulphur binding agents enabling the sulphur of the reduced gas to react on forming non-volatile sulphur compounds, for instance metal sulphides.

The invention also relates to a device or a cupola for carrying out the method. This cupola comprises a vertical shaft with continuous or downwardly enlarged cross section, inlet and outlet channels for the gas, feeding devices for coke and possibly sulphur binding agents, discharging devices for clinkers or ashes and electrodes for supplying heating current directly to the column of coke formed in the shaft. The electrodes are preferably arranged in the uppermost and in the lowermost portion of the shaft and the gas is blown in parallel with or in countercurrent to the coke, which is conveyed downwardly through the shaft during the reduction. The inlet as well as the outlet openings for the gas may be arranged above or below the electrodes. If the inlet channels for the gas are arranged ahead of the electrodes in the direction of flow of the gas it is preferable to widen those parts of the shaft where the electrodes are introduced so that said electrodes do not extend into the main passage of the gas. By such an enlargement or widening of the ends of the shaft for the introduction of the electrodes it will also be possible as mentioned above to use electrodes with larger dimensions with the aim to reduce the current density at the ends of the electrodes. This design of the parts of the cupola where the electrodes are inserted into the shaft makes it possible to produce the electrodes from a metal or an alloy, possibly in annular form. If the gas does not contact the electrodes while passing the uppermost electrodes these may, of course, be formed as ring electrodes also without widening the upper portion of the shaft.

For discharging residual coke, ash or clinker, possibly mixed with metal sulphides and excess of sulphur binding ingredients, a rotating discharging device, preferably of disc type, may be used.

In the following the invention will be described more detailed with reference to the annexed drawings, which by way of example illustrate two embodiments.

Figure 1:
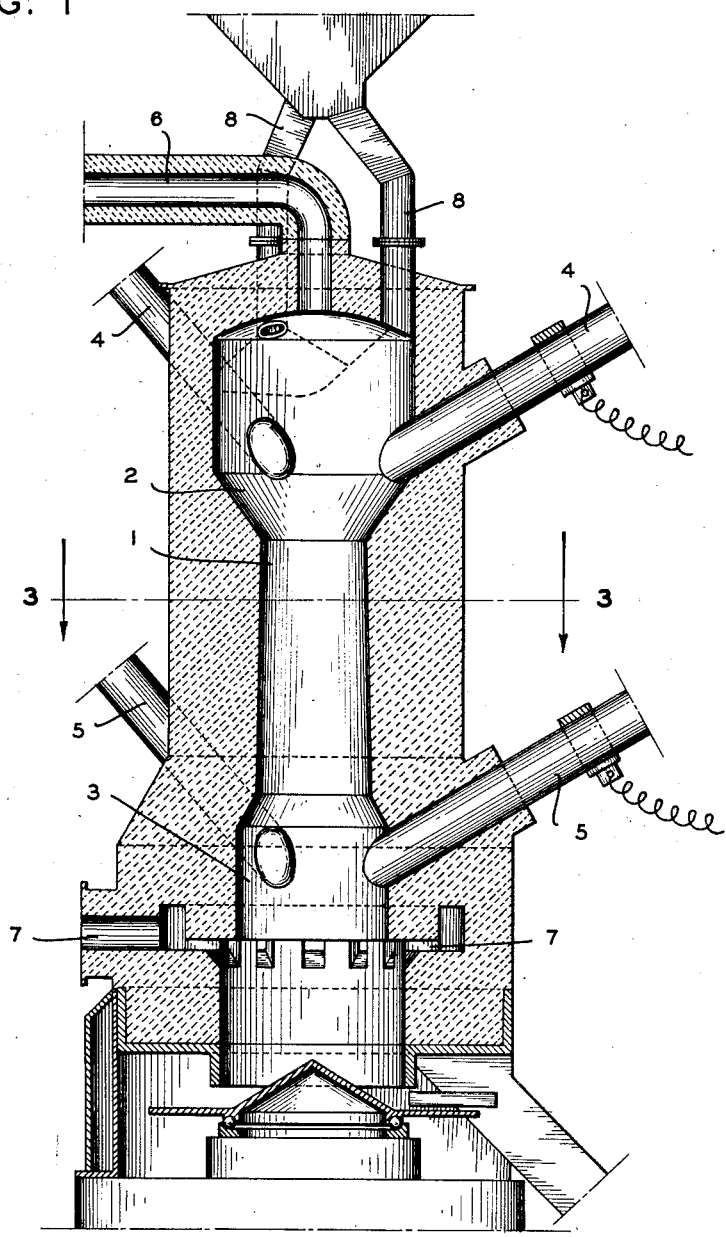
Fig. 1 is a longitudinal central section of a cupola provided with rod formed top and bottom electrodes.

In the embodiment according to Fig. 1 the reference numeral 1 designates the central portion of the shaft in which the column of coke is formed through which the gas will have to flow during the reduction. At the upper and lower ends the shaft 1 is provided with enlargements or widenings 2 and 3, respectively, into which are introduced rod electrodes, viz. the top electrodes 4 and the bottom electrodes 5. In this embodiment the supplying channel 6 for the gas to be reduced is connected centrally to the shaft at the upper end and the outlet openings 7 are arranged at the ash chamber. In the embodiment according to Fig. 1 the cupola is provided with a central hopper for feeding coke, said hopper being provided with a number of inlet pipes 8 spaced around the periphery of the shaft and connected to the same. Preferably one pipe is provided above each of the electrodes. The electrodes have to be connected in such a manner that the path of current through the coke column will be located between the top electrodes and the bottom electrodes but not between two or more top electrodes, nor between two or more bottom electrodes respectively.

The vertical length of the shaft or to put it more exactly the space between the top and the bottom electrodes as also the diameter of the shaft are to be dimensioned in such a way, that the contact between the gas flowing through said space and the heated coke will be of sufficient duration for the reduction in spite of the temperature being lower than that at which risk of sintering arises.

Figure 2:
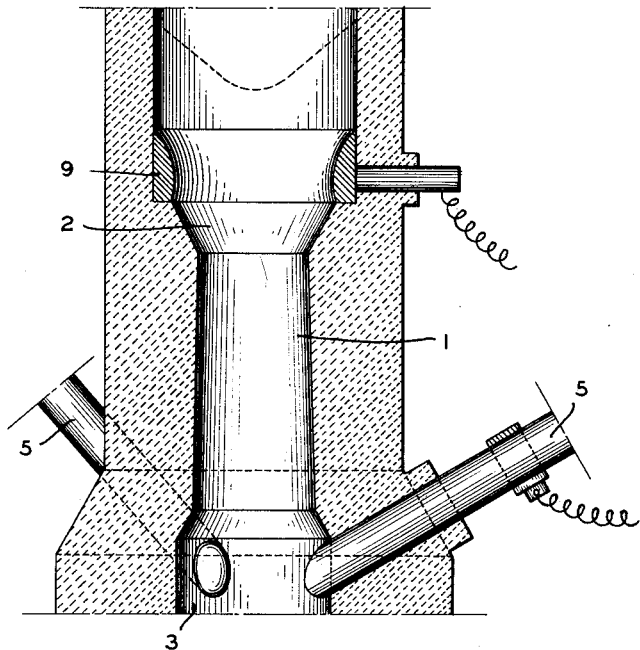
Fig. 2 is a partial section of a shaft with an annular top electrode.
Figure 3:
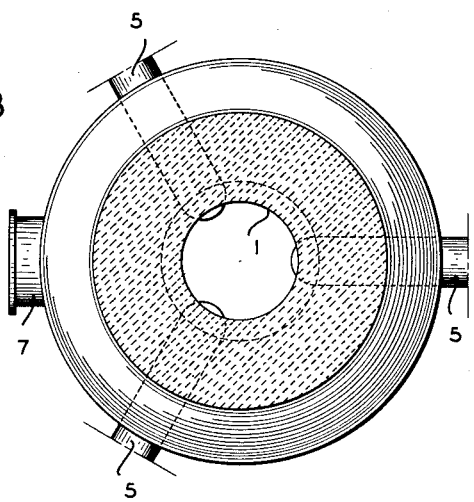
Fig. 3 is a section on the line III—III of Fig. 1.

The embodiment illustrated in Fig. 2 differs from the embodiment described above mainly in that the top electrodes are replaced by a ring electrode 9.

The arrangement according to the invention operates in the following manner.

Coke is fed downwardly into the shaft through inlet pipes 8 or an equivalent arrangement. When the shaft is charged with coke, electric current is supplied so that the column of coke in the shaft 1 is heated to the desired reducing temperature. Thereafter a gas containing carbon dioxide is led in through the pipe 6 and discharged through the channel 7. As the column of coke sinks fresh coke is supplied through the pipes 8 or the like. However, such a large quantity of coke is not to be supplied that the current carrying column of coke comes into contact with the feeding pipes, especially if these are made of metal in order to prevent current losses and accidents. In the embodiment illustrated lime or sulphur binding agents of a similar kind may be incorporated in advance in the coke. It is, however, also possible to provide the shaft with separate feeding devices for lime or the like.

We claim:

1. The method of reducing gases rich in carbon dioxide comprising the steps of forming a vertically extending and continuously sinking elongated column of substantially greater length than diameter of a carbonaceous reducing agent containing readily sintering ash constituents, supplying a reducing agent to the top of said column and discharging combustion residues from the bottom of said column, introducing the gas to be reduced into said column from above the top thereof, drawing off the reduced gas from the lower end of said column, and heating the column through substantially the entire length thereof to a temperature not exceeding the sintering temperature of the ash constituents of said carbonaceous reducing agent by passing electrical current vertically through substantially the entire height of said column.

2. The method of reducing gases rich in carbon dioxide comprising the steps of mixing a carbonaceous reducing agent containing readily sintering ash constituents with a material binding sulphur as a non-volatile compound, forming a vertically extending and continuously sinking elongated column of substantially greater length than diameter of said mixture, continuously supplying said mixture to the top of said column and discharging combustion residues from the bottom of said column, introducing the gas to be reduced into said column from above the top thereof, drawing off the reduced gas from the lower end of said column, and heating the column through substantially the entire length thereof to a temperature not exceeding the sintering temperature of the ash constituents of said carbonaceous reducing agent by passing electrical current vertically through substantially the entire height of said column.

3. The method of reducing gases rich in carbon dioxide comprising the steps of forming a vertically extending and continuously sinking elongated column of substantially greater length than diameter of particles of a carbonaceous reducing agent containing readily sintering ash constituents, the coarser particles of said agent being in the center of said column, supplying said reducing agent to the top of said column and discharging combustion residues from the bottom thereof, introducing the gas to be reduced into said column from above the top thereof, drawing off the reduced gas from the lower end of said column, and heating the column through substantially the entire length thereof to a temperature not exceeding the sintering temperature of the ash constituent of said carbonaceous reducing agent by passing electrical current vertically through substantially the entire height of said column.

4. A cupola furnace comprising a vertically extending shaft including top and bottom portions and an elongated central portion of reduced cross-sectional area for receiving a carbonaceous reducing agent, an inlet above said top portion for supplying gas to be reduced into said shaft, a second inlet into said top portion for supplying said reducing agent, an outlet from said bottom portion for withdrawing reduced gas, an outlet beneath said shaft for discharging solid combustion products, and spaced electrodes positioned in said top and bottom portions substantially adjacent the upper and lower extremities of said elongated central portion for passing electrical current vertically through substantially the entire height of said column.

5. A cupola furnace comprising a vertically extending shaft including top and bottom portions and an elongated central portion of reduced cross-sectional area for receiving a carbonaceous reducing agent, an inlet above said top portion for supplying gas to be reduced into said shaft, a plurality of spaced inlets into said top portion for continuously supplying said reducing agent in particle form, an inwardly tapered lower extremity on said top portion whereby the coarser particles of reducing agent are directed toward the center of the central portion of the shaft, an outlet from said bottom portion for withdrawing reduced gas, an outlet beneath said shaft for discharging solid combustion products, and spaced electrodes positioned in said top and bottom portions substantially adjacent the upper and lower extremities of said elongated central portion for passing electrical current vertically through substantially the entire height of said column.

6. A cupola furnace comprising a vertically extending shaft including top and bottom portions and an elongated central portion of reduced cross-sectional area for receiving a carbonaceous reducing agent, an inlet above said top portion for supplying gas to be reduced into said shaft, a second inlet into said top portion for supplying said reducing agent, an outlet from said bottom portion for withdrawing reduced gas, an outlet beneath said shaft for discharging solid combustion products, and spaced electrodes positioned in said top and bottom portions substantially adjacent the upper and lower extremities of said elongated central portion for passing electrical current vertically through substantially the entire height of said column, the extremities of said electrodes being substantially at the periphery of said central portion so as not to project into the path of gas passing therethrough.

7. A cupola furnace comprising a vertically disposed shaft including top and bottom portions and an elongated intermediate portion of reduced cross-sectional area for receiving a carbonaceous reducing agent, the height of said intermediate portion being substantially greater than the diameter thereof, an inlet above said top portion for continuously supplying gas to be reduced into said shaft, an inlet into said top portion for continuously supplying said reducing agent in particle form, said reducing agent being adapted to form a vertically extending and continuously sinking column of material, an inwardly tapered lower extremity on said top portion whereby the coarser particles of reducing agent are directed toward the center of the intermediate portion of said column, an outlet from said bottom portion for withdrawing reduced gas, an outlet below said shaft for discharging solid combustion products, and spaced electrodes positioned in said top and bottom portions substantially adjacent the upper and lower extremities of said elongated central portion for passing electrical current vertically through substantially the entire height of said column, and uniformly heating the entire volume of reducing material passing through said intermediate portion, the inner extremities of said electrodes terminating substantially at the periphery of the intermediate portion of the shaft so as not to project into the path of gas passing therethrough.

JOHN LUDVIG STÅLHED.
JOHN AUGUST BENJAMIN ÖDBERG.

REFERENCES CITED

The following references are of record in the file of this patent:

UNITED STATES PATENTS

| Number | Name | Date |
|---|---|---|
| 1,225,396 | Benjamin | May 8, 1917 |
| 1,851,473 | Wiberg | Nov. 29, 1932 |

FOREIGN PATENTS

| Number | Country | Date |
|---|---|---|
| 571,878 | Great Britain | Sept. 13, 1945 |